US006455019B2

(12) United States Patent
Jones

(10) Patent No.: US 6,455,019 B2
(45) Date of Patent: Sep. 24, 2002

(54) PROCESS FOR THE EXTRACTION OF COPPER FROM A SULPHIDE COPPER ORE OR CONCENTRATE

(75) Inventor: David L. Jones, Delta (CA)

(73) Assignee: Cominco Engineering Services Ltd., Vancouver (CA)

(*) Notice: Subject to any disclaimer, the term of this patent is extended or adjusted under 35 U.S.C. 154(b) by 0 days.

(21) Appl. No.: 09/866,027

(22) Filed: May 25, 2001

Related U.S. Application Data

(60) Continuation-in-part of application No. 09/452,431, filed on Dec. 1, 1999, now abandoned, which is a division of application No. 08/911,797, filed on Aug. 15, 1997, now abandoned.

(51) Int. Cl.[7] ............................................. C22B 15/00
(52) U.S. Cl. .............................. 423/24; 423/38; 423/41
(58) Field of Search ............................. 423/38, 39, 40, 423/41, 24

(56) References Cited

U.S. PATENT DOCUMENTS

| 4,039,406 A |   | 8/1977 | Stanley et al. |
| 4,338,168 A |   | 7/1982 | Stanley et al. |
| 5,431,788 A | * | 7/1995 | Jones |
| 5,645,708 A | * | 7/1997 | Jones |

FOREIGN PATENT DOCUMENTS

WO    WO 96/19593    6/1996

OTHER PUBLICATIONS

Paper entitled "A Hydrometallurgical Conversation Process For the Treatment of Copper Concentrate", Authors: R.W. Stanley et al of the Noranda Research Centre, Presented at the 21st Annual CIM Conference of Metallurgists, Toronto Canada, Aug. 29–Sep. 1/1982.

* cited by examiner

Primary Examiner—Steven Bos
(74) Attorney, Agent, or Firm—Elbie R. de Kock

(57) ABSTRACT

A process for the extraction of copper from a sulphide ore or concentrate comprises the steps of subjecting the ore or concentrate to pressure oxidation in the presence of oxygen and an acidic solution containing halide and sulphate ions to obtain a resulting pressure oxidation slurry. The slurry is subjected to a liquid/solid separation step to obtain a resulting pressure oxidation filtrate and a solid residue containing an insoluble basic metal sulphate salt. The basic metal sulphate salt is leached in a second leaching with an acidic sulphate solution to dissolve the basic metal salt to produce a leach liquor containing a metal sulphate, e.g. copper sulphate, in solution and a resulting solid residue. The leach liquor is separated from the solid residue and subjected to a solvent extraction process to produce metal concentrate solution and a metal depleted raffinate. At least a portion of the raffinate is recycled to the pressure oxidation after being subjected to evaporation.

14 Claims, 2 Drawing Sheets

PROCESS FOR THE EXTRACTION OF COPPER FROM A SULPHIDE COPPER ORE OR CONCENTRATE

CROSS REFERENCE TO RELATED APPLICATION

This application is a continuation-in-part division of U.S. patent application Ser. No. 09/452,431 filed Dec. 1, 1999, abandoned which in turn is a division of U.S. patent application Ser. No. 08/911,797 filed Aug. 15, 1997, abandoned. The contents of the foregoing applications are incorporated herein by reference.

FIELD OF THE INVENTION

This invention relates to the hydrometallurgical treatment of metal ores or concentrates. In particular, it relates to the extraction of copper from sulphide ores or other concentrates in the presence of halogen ions, such as chloride ions.

BACKGROUND OF THE INVENTION

The hydrometallurgical treatment of sulphide concentrates whereby the concentrate is subjected to pressure oxidation in the presence of chloride ions is known. See for example U.S. Pat. No. 4,039,406; 5,645,708; and 5,650,057.

The purpose of the present invention is to provide an improved process for the extraction of metals from sulphide ores.

SUMMARY OF THE INVENTION

According to the invention there is provided a process for the extraction of copper from a sulphide copper ore or concentrate, comprising the steps of subjecting the ore or concentrate to pressure oxidation in the presence of oxygen and an acidic solution containing halide and sulphate ions to obtain a resulting pressure oxidation slurry, subjecting the slurry to a liquid/solid separation step to obtain a resulting pressure oxidation filtrate and a solid residue containing an insoluble basic copper sulphate salt; leaching the basic copper sulphate salt produced by the pressure oxidation with an acidic sulphate solution in a second leaching to dissolve the basic copper salt to produce a leach liquor containing copper sulphate in solution and a resulting solid residue; separating the leach liquor from the solid residue; subjecting the leach liquor to a solvent extraction process to produce copper concentrate solution and a copper depleted raffinate; recycling at least a portion of the raffinate to the pressure oxidation; and wherein the raffinate is subjected to evaporation to remove water therefrom prior to the recycle thereof; and wherein the evaporation is effected by means of a direct-fired evaporation process comprising the submerged combustion of a fuel in the raffinate being recycled.

The term "concentrate" in this specification refers to any material in which the metal value content has been increased to a higher percentage by weight as compared with the naturally occurring ore and includes man made artificial sulphide ore, such as matte, and metal values precipitated as solids such as hydroxides and sulphides.

Further objects and advantages of the invention will become apparent from the description of preferred embodiments of the invention below.

DETAILED DESCRIPTION OF PREFERRED EMBODIMENTS

The feed ore or concentrate to the process may contain one or more sulphide minerals of the base metals Cu, Ni, Co and Zn, frequently combined with Fe and sometimes with other elements, such as As, Sb, and Ag.

Figure 1:
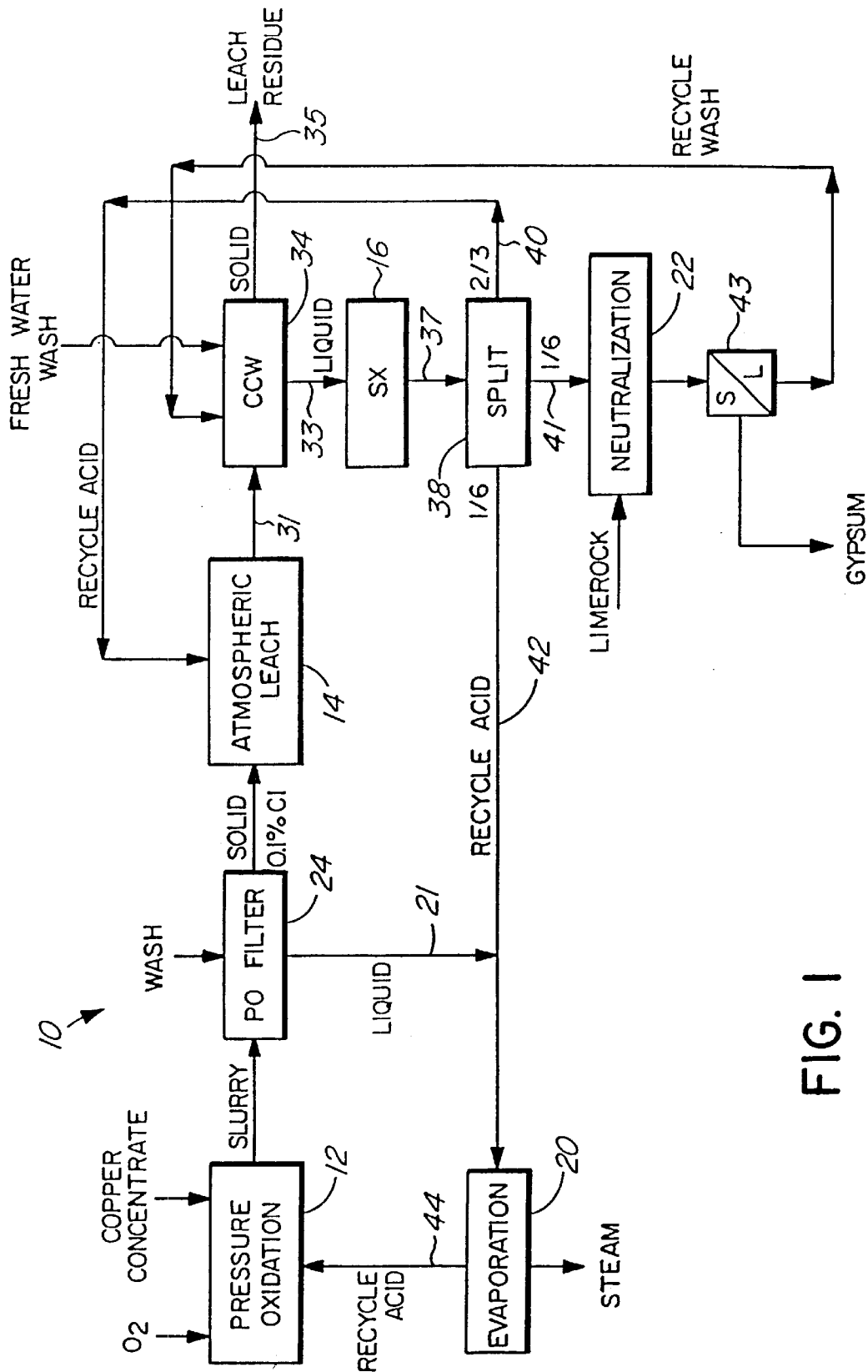
FIG. 1 is a flow diagram of a hydrometallurgical metal extraction process according to one embodiment of the invention.

In FIG. 1, reference numeral 10 generally indicates a hydrometallurgical process according to one embodiment of the invention. The process 10 comprises a pressure oxidation stage 12, an atmospheric leach 14, a liquid/solid separation 24, a solvent extraction 16, an evaporation stage 20 and a neutralization 22.

Prior to the pressure oxidation stage 12, the copper concentrate is first subjected to a regrind to reduce the particle size to about 2%+325 mesh.

The concentrate is subjected to the pressure oxidation 12 in an autoclave in the presence of an acidic solution containing sulphate, chloride and preferably copper ions.

The amount of acid introduced into the pressure oxidation 12 (by way of recycle after the initial startup, as will be described below) is sufficient to maintain the discharge solution from the autoclave, when operated in a continuous mode, at a pH of above 2.0, typically pH 2.3–3.8.

The chloride ion concentration in the solution in the autoclave is maintained at about 8–20 g/L, preferably about 12 g/L.

The pressure oxidation 12 is carried out at a temperature of from about 115° C. to about 175° C., preferably about 130° C. to about 155° C., under a pressure of about 100–300 psig. This is total pressure comprising oxygen pressure plus steam pressure.

The retention time is about 0.5–2.5 hours and the process is normally carried out in a continuous fashion in the autoclave. However, the process can also be carried out in a batch-wise fashion, if desired.

In the pressure oxidation stage 12, all copper minerals are converted to basic copper sulphate $CuSO_4 \cdot 2Cu(OH)_2$, i. e. all the copper being recovered reports to the solid phase in the pressure oxidation 12.

The solids content in the autoclave is maintained at about 12–25%, i.e. 150–300 g/L solids as determined by the heat balance and viscosity limitations.

The slurry produced in the autoclave is discharged through a series of one or more flash tanks (not shown) to reduce the pressure to atmospheric pressure and the temperature to about 90–100° C. The liquid part of the slurry is referred to as the product solution from the pressure oxidation stage 12 and is indicated by reference numeral 21.

The slurry from the flash tank(s) 22 is filtered, as shown at 24, and the resultant filter cake is washed thoroughly to remove entrained liquor as much as possible.

The solids from the pressure oxidation stage 12 after the filtration 24, are treated in the atmospheric leaching stage 14 at about pH 1.2 to pH 2.2 using raffinate from the solvent extraction 16, which is acidic, to dissolve the basic copper sulphate. The leaching 14 takes place at a temperature of about 40° C. for a retention time of about 15–60 minutes. The percentage solids in the feed to the leach 14 is typically about 3–15% or about 30–170 g/L, although it is possible to operate the process outside this range. The percentage solids drops substantially during the leach 14 as the basic copper sulphate dissolves. Thus, the product g/L solids may be as little as one half of the feed g/L solids.

During the atmospheric leaching stage 14, the basic copper salts dissolve almost completely with very little of the iron present in the concentrate going into solution, provided care is taken to maintain the pH in the range 1.2 to 2.2, preferably pH 1.5 to 2.0.

The slurry 31 from the atmospheric leaching stage 14 is sometimes difficult if not impossible to filter, but settles well. In view of the need to wash the leach solids very thoroughly, the slurry 31 is pumped to a counter current decantation (CCD) wash circuit 34. In the CCD circuit 34, the solids are fed through a series of thickeners with wash water added in the opposite direction. By this method, the solids are washed and entrained solution removed, together with the soluble metals dissolved therein. About 3 to 7 thickeners (not shown) are required with a wash ratio (water to solids) of about 2 to 5 to reduce entrained liquor down to less than 100 ppm dissolved Cu in the final residue.

The thickener underflow from the last thickener is the final residue stream 35 at about 50% solids. This can be treated for the recovery of precious metals, such as gold and silver, or sent to tailings.

The main constituents of the stream 35 are hematite and elemental sulphur, which may also be recovered by a combination of other processes, such as flotation and leaching into a specific solvent for sulphur, e.g. perchloroethylene, if market conditions warrant.

The thickener overflow from the first thickener is the product solution 33 which is fed to the solvent extraction stage 16, as shown.

Copper is extracted from the product solution 33 from the CCD circuit 34 in two stages of extraction in the solvent extraction stage 16 to produce a raffinate 37.

The raffinate 37 is split, as indicated at 38, into three streams 40, 41 and 42. The stream 40 which comprises about ⅔ of the raffinate 37 is recycled to effect the atmospheric leach 14, as indicated above. The actual volume of 40 is determined by the acid needs of the leach 14, to dissolve the basic copper sulphate as described, and maintain a slight excess of acid, i.e. pH 1.5–2.0 which corresponds to about 1–5 g/L $H_2SO_4$. The acid requirements for stream 40 are less than the total acid contained in 37, and part of the remainder is used in the pressure oxidation 12 as an acid source for the reactions therein. This is supplied by stream 42. Any acid still left over from 37, not used by 40 or 42, is considered excess, and is neutralized. This is stream 41. Typically streams 41 and 42 are each about ⅙ of 37. The stream 41 which comprises about ⅙ of the raffinate 37 is subjected to the neutralization 22 with lime rock and after liquid/solid separation 43 results in gypsum, which can be discarded, and wash water which is recycled as wash water to the CCD wash circuit 34.

The liquid 21 from the filtration 24, along with the stream 42, is subjected to the evaporation 20 to remove water and produce a more concentrated acid and chloride solution 44 which is recycled to the pressure oxidation 12.

The evaporation of the solution prior to recycling is problematical due to the very corrosive nature thereof, i.e. high acidity (50 g/L free acid), high chloride content (12 g/L) and high temperature in evaporation. This precludes the use of most if not all commercially available evaporators, which are normally based on indirect heat transfer through thin metal surfaces, such as shell and tube evaporators made typically of stainless steel. Titanium would be suitable but is too expensive if used in the large quantities which would be required for this type of application.

However, the problem has been solved by direct-fired evaporation using submerged combustion of a fuel in the solution 44 and using titanium material.

In order to keep the size of the evaporator down, and minimize operating and capital costs, the amount of water to be evaporated must be minimized. In order to achieve this, the copper concentration in the stream 31 is maintained at a more concentrated level, i.e. at about 35 g/L, compared with a value of 12 g/L in the absence of evaporation. This in turn generates a more concentrated acid stream 42 containing about 48 g/L $H_2SO_4$ instead of only 18 g/L $H_2SO_4$. This effectively reduces the volume of the water to be evaporated by putting the same mass of acid in a smaller volume of water, thus reducing the size of the evaporator, hence justifying the use of titanium, and the fuel costs necessary to operate a direct fired evaporator. Direct fired evaporators do not have the advantage of multiple effect of the steam generated which can generally reduce fuel costs in indirect evaporators, and thus justify evaporating large volume of water.

Figure 2:
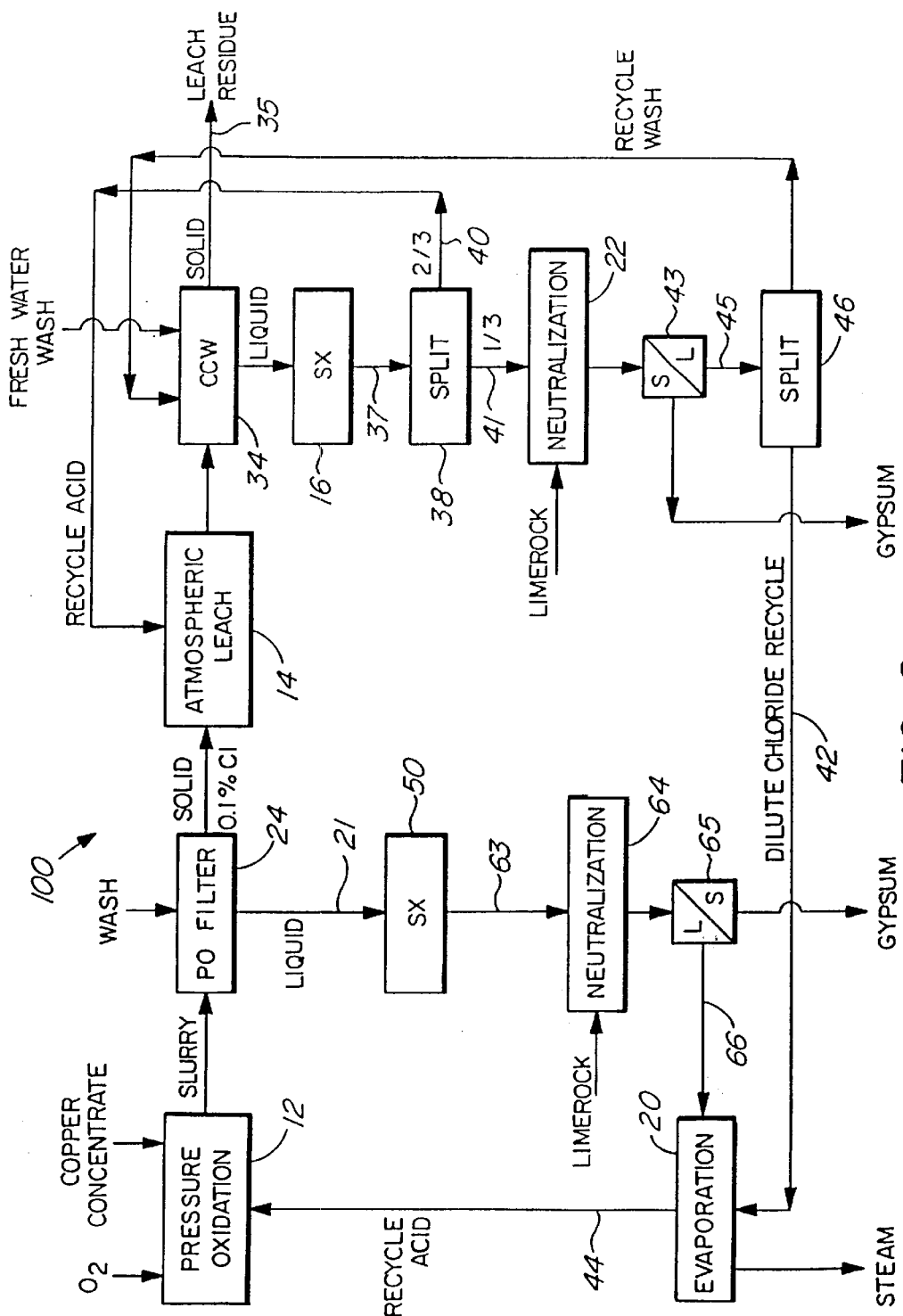
FIG. 2 is a flow diagram of a hydrometallurgical metal extraction process according to another embodiment of the invention.

With reference to FIG. 2, a process 100 according to another embodiment of the invention is shown.

The process 100 also comprises a pressure oxidation stage 12, filtration 24, atmospheric leach 14, CCD wash circuit 34, solvent extraction 16, evaporation 20 and neutralization 22.

In the process 100 some of the metal values being recovered also report to the pressure oxidation liquid 21 in addition to the solid, which solid is subjected to the atmospheric leach 14 as described with reference to FIG. 1.

The liquid 21 from the filtration 24 is subjected to a copper solvent extraction 50 in order to recover copper values therefrom.

It should be noted that although the step 24 is referred to as a filtration, any suitable liquid/solid separation method can be employed.

The filtration 24 is the separation point between the high chloride liquid used in the pressure oxidation 12, which liquid is recycled as indicated, and a low chloride or chloride free liquid going to the atmospheric leach 14. The filtration 24 is always accompanied by a wash with water or recycled low chloride water or a concentration of both to remove as much chloride from the solids (filter cake) as possible. The objective is to minimize transfer of chloride from the high chloride circuit to the low chloride circuit, to counteract chloride build up in the latter circuit.

However, despite the washing of the solid residue produced by the filtration 24, the chloride concentration is prone to increase in the low chloride circuit, because it is essentially a dead ended circuit with minimum bleed.

This problem has been overcome by recycling a stream from the low chloride circuit to the high chloride circuit. This stream is indicated by reference numeral 42 in FIG. 2 to correspond with the stream 42 in FIG. 1 which also comprises a recycle from the low chloride circuit to the high chloride circuit.

Again the stream 42 is subjected to the evaporation 20, as described with reference to FIG. 1, prior to recycle to the pressure oxidation 12. However, in this case, there is no need to recycle acid from the low chloride circuit because enough acid is generated by the copper solvent extraction 50 in the form of raffinate 63. In fact, it is usually necessary to neutralize some of the acid in the raffinate 63, as indicated at 64 prior to recycling the raffinate 63. As indicated at 65, the neutralization product is subject to a liquid/solid separation step to produce solid gypsum which can be discarded and a liquid 66 which is subjected to the evaporation 20 before recycle.

Since there is no need to recycle acid from the low chloride circuit, the raffinate 37 from the solvent extraction 16 is split into only two streams, i.e. ⅔ into stream 40 which is used in the atmospheric leach 14, and ⅓ into stream 41 which is subjected to the neutralization 22 and liquid/solid separation 43 to produce solid gypsum which can be discarded and a stream 45 which is split, as indicated at 46 into a stream which is recycled as wash water to the CCD circuit 34 and stream 42 which goes to the evaporation 20 for recycle to the pressure oxidation 12. This serves to recycle chloride from the low chloride circuit back to the high chloride circuit.

While only preferred embodiments of the invention have been described herein in detail, the invention is not limited thereby and modifications can be made within the scope of the attached claims.

What is claimed is:

1. A process for the extraction of copper from a sulphide copper ore or concentrate, comprising the steps of:

subjecting the ore or concentrate to pressure oxidation in the presence of oxygen and an acidic solution containing halide and sulphate ions to obtain a resulting pressure oxidation slurry, subjecting the slurry to a liquid/solid separation step to obtain a resulting pressure oxidation filtrate and a solid residue containing an insoluble basic copper sulphate salt;

leaching the basic copper sulphate salt produced by the pressure oxidation with an acidic sulphate solution in a second leaching to dissolve the basic copper salt to produce a leach liquor containing copper sulphate in solution and a resulting solid residue;

separating the leach liquor from the solid residue;

subjecting the leach liquor to a solvent extraction process to produce copper concentrate solution and a copper depleted raffinate;

recycling at least a portion of the raffinate to the pressure oxidation; and wherein the raffinate is subjected to evaporation to remove water therefrom prior to the recycle thereof; and wherein the evaporation is effected by direct-fired evaporation comprising the submerged combustion of a fuel in the raffinate being recycled.

2. The process according to claim 1, further comprising the steps of splitting the raffinate in at least two portions, wherein the one portion is recycled to the pressure oxidation and the other portion is recycled to the second leaching.

3. The process according to claim 1, further comprising the step of recycling the pressure oxidation filtrate to the pressure oxidation.

4. The process according to claim 3, further comprising the step of subjecting the pressure oxidation filtrate to evaporation to remove water therefrom prior to the recycle thereof to the pressure oxidation.

5. The process according to claim 4, wherein the evaporation is effected by direct-fired evaporation comprising the submerged combustion of a fuel in the filtrate being recycled.

6. A process according to claim 3, further comprising the steps of subjecting the pressure oxidation filtrate to a solvent extraction process, prior to the recycling of the filtrate, to produce a further copper concentrate solution and a further copper depleted raffinate which further copper depleted raffinate is recycled to the pressure oxidation.

7. The process according to claim 6, further comprising the step of subjecting the further copper depleted raffinate to neutralization prior to the recycling thereof to the pressure oxidation.

8. The process according to claim 1, wherein the pressure oxidation is carried out at a pH value of above 2.

9. The process according to claim 8, wherein the pH in the pressure oxidation is from 2.3 to 3.8.

10. The process according to claim 1, wherein the second leaching is effected at a pH in the range of 1.2 to 2.2.

11. The process according to claim 10, wherein the pH in the second leaching is from 1.5 to 2.0.

12. The process according to claim 1, wherein the pressure oxidation slurry is flashed to atmospheric pressure at a temperature below the melting point of elemental sulphur.

13. The process according to claim 1, wherein the halide is selected from chloride and bromide.

14. The process according to claim 1, wherein the copper concentration in the leach liquor is maintained at a value of 35 g/L.

* * * * *